United States Patent
Takano (12)

(10) Patent No.: US 6,822,047 B2
(45) Date of Patent: Nov. 23, 2004

(54) ADHESIVE WITH CARBOXYL BENZOTRIAZOLE FOR IMPROVED ADHESION TO METAL SUBSTRATES

(75) Inventor: Tadashi Takano, Santa Ana, CA (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 45 days.

(21) Appl. No.: 10/336,067

(22) Filed: Jan. 2, 2003

(65) Prior Publication Data

US 2004/0132955 A1 Jul. 8, 2004

(51) Int. Cl.$^7$ ............................................. C08L 63/00
(52) U.S. Cl. ....................... 525/107; 525/114; 525/117; 525/122
(58) Field of Search ................................. 525/107, 114, 525/117, 122, 92, 100, 103, 170

(56) References Cited

U.S. PATENT DOCUMENTS 6,207,786 B1   3/2001   Ishida

FOREIGN PATENT DOCUMENTS

JP           11024263    *   1/1999

OTHER PUBLICATIONS

Derwent Abstract of JP'263.*

* cited by examiner

Primary Examiner—Margaret G. Moore
Assistant Examiner—Marc S Zimmer
(74) Attorney, Agent, or Firm—Jane E. Gennaro

(57) ABSTRACT

An adhesive for use on metal substrates, and particularly on copper substrates, comprises (a) carboxyl benzotriazole, (b) an epoxy resin having a reactive double bond, (c) a radical curing resin, and (d) a radical initiator. The combination of elements (a) and (b) in a radical curing resin system composed of the elements (c) and (d) provides improved adhesion strength to copper metal compared to compositions containing (c) and (d) without (a) and (b).

7 Claims, No Drawings

ADHESIVE WITH CARBOXYL BENZOTRIAZOLE FOR IMPROVED ADHESION TO METAL SUBSTRATES

FIELD OF THE INVENTION

This invention relates to adhesive compositions for use on metal substrates, and particularly for use on copper lead-frames within semiconductor packages.

BACKGROUND OF THE INVENTION

Carboxyl benzotriazole is known as a good chelating material to copper metal. It is used not only as an antioxidant for metal substrates, but also as an adhesion promoter for epoxy resin pastes. Radical curing resins, such as acrylate or methacrylate esters, maleimide resins, vinylether resins and bismaleimide resins, for example, have been studied and applied for use in die attach adhesives in semiconductor packaging because of their low moisture absorption, ability to cure, and long pot life. However, these compositions are still deficient in providing good adhesion to copper lead frames.

SUMMARY OF THE INVENTION

This invention is an adhesive for use on metal substrates, and particularly on copper substrates, comprising (a) carboxyl benzotriazole, (b) an epoxy resin having a reactive double bond, (c) a radical curing resin, and (d) a radical initiator. The combination of elements (a) and (b) in a radical curing resin system composed of the elements (c) and (d) provides improved adhesion strength to copper metal compared to compositions containing (c) and (d) without (a) and (b).

DETAILED DESCRIPTION OF THE INVENTION

Carboxyl benzotriazole has the structure

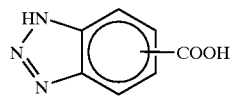

and is commercially available from Johoku Chemical Co. LTD. When used in the adhesive compositions of this invention, carboxyl benzotriazole will be present in an amount of 0.5 to 15 wt %.

Suitable epoxy resins having reactive double bonds include polymers, such as, epoxidized poly(butadiene), commercially available from Daicel Chemical Industries LTD; cycloaliphatic epoxies, for example, such as, (3,4-epoxycyclohexyl)methyl methacrylate, commercially available from Daicel Chemical Industries LTD and having the structure:

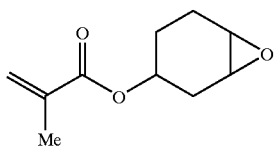

and aromatic epoxies, for example, such as those having the structure:

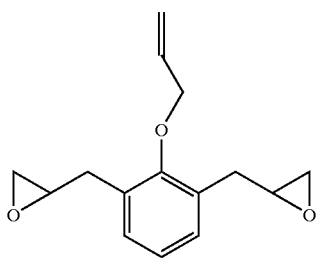

Radical curing resins, which will benefit in adhesion to metal substrates by the addition of the epoxy resin and carboxyl benzotriazole, include acrylate resins, methacrylate resins, maleimide resins, bismaleimide resins, vinylether resins, poly(butadiene) resins, and polyester resins. Suitable radical initiators include organic peroxides and azo compounds from Crompton Corporation, Akuzo Noble, Kayaku-Akuzo.

EXAMPLES

Two radical curing resin and initiator formulations (RCR) were prepared as controls. These control compositions were then augmented with the combination of an epoxy with a reactive double bond and carboxyl benzotriazole at varying levels. All formulations were tested for die shear strength according to the following protocol:

Each formulation was dispensed on a copper metal lead frame, supplied from Hirai Seimitu Kougyou (Japan). A 300×300×15 mil bare silicon die was then mounted on the adhesive by hand. All speciments were cured in a box oven, with the temperature ramped to 175° C. over 30 minutes and held at 175° C. for 15 minutes under nitrogen. The specimens were then placed on a 240° C. hot plate for one minute, followed by 175° C. in a box oven for four hours, to simulate a semiconductor packaging process. Resulting specimens were tested for die shear strength using a Model Dagy 2400PC, Dagy The formulations and results are set out in the following tables.

TABLE 1

Radical Curing Resin Formulations
(parts by weight)

| RCR A | | RCR B | |
|---|---|---|---|
| Urethane acrylate | 50 | Maleimide | 45 |
| Lauryl acrylate | 30 | Bismaleimide | 20 |
| Adhesion promoter | 1 | Vinyl ether | 20 |
| Radical initiator | 1 | Adhesion promoter | 1 |
| | | Radical initiator | 2 |
| TOTAL parts by weight | 82 | | 88 |

TABLE 2

Final Formulation with RCR A (parts by weight) And Die Shear Strength

| | A1 | A2 | A3 | A4 | A5 | A6 | A7 | A8 | A9 | A10 |
|---|---|---|---|---|---|---|---|---|---|---|
| RCR A | 82 | 82 | 82 | 82 | 82 | 82 | 82 | 82 | 82 | 82 |
| NMP solvent | 4 | 4 | 4 | 4 | 4 | 4 | 4 | 4 | 4 | 4 |
| CBT* | 2 | | 2 | | 1 | 5 | 10 | 2 | 2 | 2 |
| Epoxy resin | 10 | 10 | | | 10 | 10 | 10 | 5 | 30 | 50 |
| Silver filler | 350 | 350 | 350 | 350 | 350 | 350 | 350 | 350 | 350 | 350 |
| Total ppw** | 98 | 96 | 88 | 86 | 97 | 101 | 106 | 93 | 118 | 138 |
| Wt % CBT** | 2.0 | 0.0 | 2.3 | 0.0 | 1.0 | 5.0 | 9.4 | 2.2 | 1.7 | 1.4 |
| Wt % epoxy** | 10.2 | 10.4 | 0.0 | 0.0 | 10.3 | 9.9 | 9.4 | 5.4 | 25.4 | 36.2 |
| Die shear @ 260° C. | 8.6 | 0.5 | 3.0 | 0.0 | 8.6 | 13.6 | 8.7 | 8.7 | 8.0 | 6.2 |

*Carboxybenzotriazole
**Excluding silver filler

TABLE 3

Final Formulation with RCR B (parts by weight) And Die Shear Strength

| | B1 | B2 | B3 | B4 | B5 | B6 | B7 | B8 | B9 | B10 |
|---|---|---|---|---|---|---|---|---|---|---|
| RCR B | 88 | 88 | 88 | 88 | 88 | 88 | 88 | 88 | 88 | 88 |
| NMP solvent | 4 | 4 | 4 | 4 | 4 | 4 | 4 | 4 | 4 | 4 |
| CBT* | 2 | | 2 | | 1 | 5 | 10 | 2 | 2 | 2 |
| Epoxy resin | 10 | 10 | | | 10 | 10 | 10 | 5 | 30 | 50 |
| Silver filler | 350 | 350 | 350 | 350 | 350 | 350 | 350 | 350 | 350 | 350 |
| Total ppw** | 104 | 102 | 94 | 92 | 103 | 107 | 112 | 99 | 124 | 144 |
| Wt % CBT** | 1.9 | 0.0 | 2.1 | 0.0 | 1.0 | 4.7 | 8.9 | 2.0 | 1.6 | 1.4 |
| Wt % epoxy** | 9.6 | 9.8 | 0.0 | 0.0 | 9.7 | 9.3 | 8.9 | 5.1 | 24.2 | 34.7 |
| Die shear @ 260° C. | 14.4 | 0.6 | 1.8 | 0.0 | 1.8 | 10.4 | 8.5 | 6.9 | 5.8 | 6.3 |

*Carboxybenzotriazole
**Excluding silver filler

From the above examples it can be seen that the combination of an epoxy resin containing at least one reactive carbon to carbon double bond and carboxy benzotriazole improves the adhesion of radical curing resins to metal substrates. The combination of the epoxy resin and carboxy benzotriazole preferably will be in the range of 5% to 40% by weight of the total adhesive composition, excluding fillers, and more preferably will be in the range of 10% to 15% by weight. The ratio of carboxy benzotriazole to epoxy resin will be from 1:2 to 1:40, and preferably will be 1:2 to 1:5.

What is claimed:

1. An adhesive composition comprising:

(a) carboxyl benzotriazole (b) an epoxide-containing compound having a reactive double bond, selected from the group consisting of epoxidized poly(butadiene), 3,4-epoxycyclohexyl methyl methacrylate, and the epoxy having the structure

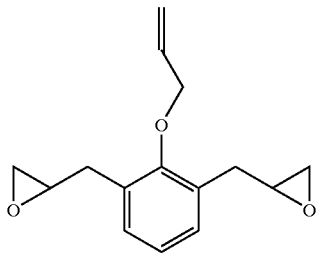

(c) a radical curing resin, and (d) a radical initiator.

2. The adhesive composition according to claim 1 in which the radical curing resins are selected from the group consisting of acrylate resins, methacrylate resins, maleimide resins, bismaleimide resins, vinylester resins, poly (butadiene) resins, and polyester resins.

3. The adhesive composition according to claim 1 in which the radical curing initiator is selected from the group consisting of organic peroxides and azo compounds.

4. The adhesive composition according to any one of claims 1, 2, or 3, in which the ratio of the carboxyl benzotriazole to epoxy resin is 1:2 to 1:40.

5. The adhesive composition according to any one of claims 1, 2, or 4, in which the ratio of the carboxyl benzotriazole to epoxy resin is 1:2 to 1:5.

6. The adhesive composition according to any one of claims 1, 2, or 3, in which the combination of the carboxyl benzotriazole and epoxy resin ranges from 5 weight percent to 40 weight percent of the adhesive composition.

7. The adhesive composition according to any one of claims 1, 2, or 3, in which the combination of the carboxyl benzotriazole and epoxy resin ranges from 10 weight percent to 15 weight percent of the adhesive composition.

* * * * *